(12) United States Patent
Durupt et al.

(10) Patent No.: US 11,346,800 B2
(45) Date of Patent: May 31, 2022

(54) INORGANIC HUMIDITY SENSOR DEVICE

(71) Applicant: MEAS France, Toulouse (FR)

(72) Inventors: Emilien Durupt, Toulouse (FR); Damien Andreu, Toulouse (FR)

(73) Assignee: MEAS FRANCE, Toulouse (FR)

( * ) Notice: Subject to any disclaimer, the term of this patent is extended or adjusted under 35 U.S.C. 154(b) by 15 days.

(21) Appl. No.: 17/028,478

(22) Filed: Sep. 22, 2020

(65) Prior Publication Data
US 2021/0123879 A1   Apr. 29, 2021

(30) Foreign Application Priority Data
Oct. 25, 2019   (EP) ..................................... 19306388

(51) Int. Cl.
*G01N 27/22*   (2006.01)

(52) U.S. Cl.
CPC ......... *G01N 27/223* (2013.01); *G01N 27/226* (2013.01); *G01N 27/227* (2013.01)

(58) Field of Classification Search
CPC ..... G01N 27/227; G01N 27/121; G01N 27/00
See application file for complete search history.

(56) References Cited

U.S. PATENT DOCUMENTS

| 7,971,482 | B2 | 7/2011 | Isogai et al. | |
|---|---|---|---|---|
| 2006/0055503 | A1* | 3/2006 | Tanida | G01N 27/225 338/38 |
| 2008/0257037 | A1* | 10/2008 | Isogai | G01N 27/225 73/335.04 |
| 2016/0148911 | A1* | 5/2016 | Do | H05K 1/0295 438/28 |
| 2016/0294016 | A1* | 10/2016 | Asai | H01M 10/0562 |
| 2017/0074815 | A1 | 3/2017 | Udrea et al. | |
| 2017/0248536 | A1* | 8/2017 | Chen | G01N 27/223 |
| 2019/0391103 | A1* | 12/2019 | Durupt | G01N 27/227 |

FOREIGN PATENT DOCUMENTS

EP   3495807 A1   6/2019

OTHER PUBLICATIONS

Extended European Search Report, European Application No. 19306388.0-1020, European Filing Date, dated Mar. 27, 2020.
Steele, J. et al., "Nanostructured Metal Oxide Thin Films for Humidity Sensors," IEEE Sensors Journal, Aug. 1, 2008, vol. 8 No. 8, pp. 1422-1429, IEEE Service Center, NY, USA.

* cited by examiner

*Primary Examiner* — Alvaro E Fortich

(57) ABSTRACT

A humidity sensor device includes a substrate and a pair of interdigitated electrodes formed over the substrate.

18 Claims, 3 Drawing Sheets

INORGANIC HUMIDITY SENSOR DEVICE

CROSS-REFERENCE TO RELATED APPLICATION

This application claims the benefit of the filing date under 35 U.S.C. § 119(a)-(d) of European Patent Application No. 19306388, filed on Oct. 25, 2019.

FIELD OF THE INVENTION

The present invention relates to a humidity sensor device and, more particularly, to an inorganic humidity sensor device.

BACKGROUND

Temperature sensors, humidity sensors, optical sensors or a combination thereof are known to be used in windshield sensing devices installed in vehicles for the purpose of automatically controlling the heating, ventilation, air conditioning and operation of the windshield wiper. As an example, a windshield humidity sensing device is commonly used for preventing fogging conditions and for wiper control.

In the art, a humidity sensor device is known that comprises a dielectric substrate, two electrodes formed on the dielectric substrate and a sensitive polymeric layer for absorption and/or adsorption of water formed on the two electrodes. A variation of capacitance, resistivity or impedance caused by the absorption and/or adsorption of water can be measured and used for the determination of the (relative) humidity of an environment under the assumption that the water amount detected by the sensor is in thermal equilibrium with the gaseous fraction of water in the environment.

However, the organic polymer material suffers from degradation during lifetime and is affected by relatively high temperatures that, for example, arise during the process of manufacturing of the sensor device or in-the-field operation in particular applications. Particularly, the relatively low glass transitions temperature of polymeric materials pose problems during reflow processing of the dies. Moreover, the overall manufacturing process comprising the formation of inorganic and organic material layers is relatively complex. Additionally, response times of conventional polymeric humidity sensor devices are relatively low (of the order of seconds).

SUMMARY

A humidity sensor device includes a substrate and a pair of interdigitated electrodes formed over the substrate.

BRIEF DESCRIPTION OF THE DRAWINGS

The invention will now be described by way of example with reference to the accompanying Figures, of which.

DETAILED DESCRIPTION OF THE EMBODIMENT(S)

Features and advantages of the present invention will be described with reference to the drawings. In the description, reference is made to the accompanying figures that are meant to illustrate embodiments of the invention. It is understood that such embodiments do not represent the full scope of the invention.

The present invention provides an inorganic humidity sensor device that is, for example, suitable for sensing the (relative) humidity in the vicinity of a windshield of a vehicle. The provided humidity sensor device can be manufactured relatively easily by mass production semiconductor manufacturing techniques and, particularly, resists relatively high temperatures.

Figure 1:
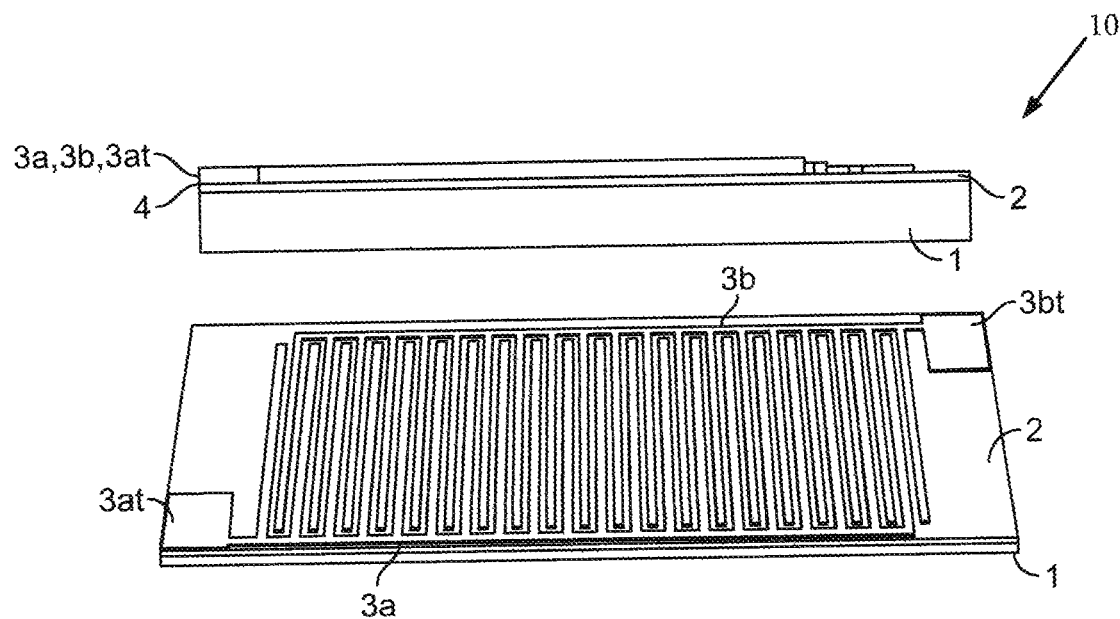
FIG. 1 is a side view and a perspective view of a humidity sensor device according to an embodiment.

FIG. 1 exemplarily shows an embodiment of a humidity sensor device 10 according to the invention. The humidity sensor device 10 comprises a semiconductor bulk substrate 1. The semiconductor bulk substrate 1 may be a (poly) silicon substrate. A sapphire substrate or any other substrate suitable for microfabrication production lines can alternatively be used.

An inorganic dielectric layer 2 serving as an adsorbing/absorbing sensing layer is formed on the semiconductor bulk substrate 1, as shown in FIG. 1. The inorganic dielectric layer 2 exhibits a well-defined adsorption/absorption rate for water. The inorganic dielectric layer 2 may be a nitride layer, for example, an $Si_3N_4$ layer. A pair of interdigitated electrodes 3a, 3b is formed over the inorganic dielectric layer 2. Formation of the pair of interdigitated electrodes 3a, 3b over the inorganic dielectric layer 2 can be facilitated by an adhesion layer 4, for example, made of or comprising Cr, formed on the inorganic dielectric layer 2 (see top view of FIG. 1). No organic material is comprised in the inorganic dielectric layer 2.

Both electrodes 3a and 3b are formed in the same horizontal plane and they can be made of the same material. For example, the electrodes 3a, 3b can be made of or comprise a noble metal, in particular, gold or platinum, to provide for chemical resistance and durability. Alternative materials that are suitable for manufacturing the electrodes 3a, 3b include aluminum and copper. Voltages can be applied via the electrode terminals 3at and 3bt that can be made of the same material as the electrodes 3a and 3b. Moreover, a compact design with horizontal dimensions of the vertical multi-layer stack in the range of about 600 µm down to 300 µm, for example, can be realized.

Figure 3:
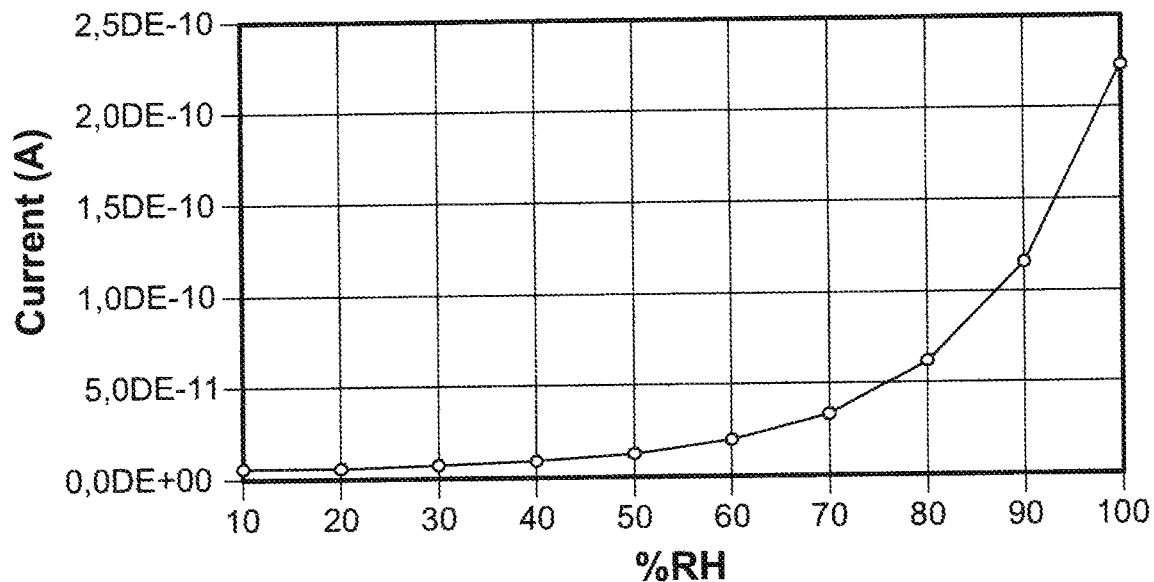
FIG. 3 is a graph of experimental results for a current measurement of the humidity sensor device.

The configuration shown in FIG. 1 allows for a sensitivity of the humidity sensor device 10 over the entire humidity range (0% to 100%) and sub-second response times. FIG. 3 exemplarily shows experimental results for a measurement of a current flowing between the interdigitated electrodes 3a and 3b through the inorganic dielectric layer 2 as a function of the relative humidity giving rise to the adsorption of water in the inorganic dielectric layer 2.

The number of electrode 3a, 3b teeth, the widths and lengths of the teeth as well as the pitches (distances between the teeth) can be adjusted to concrete applications. Exemplary ranges are 10 nm and even below in the case of electronic lithography (according to the resolution of the microfabrication process chosen) to several tens of μm for the widths. The number of digits may be in a range between a few tens to several tens of thousands, their length ranging from a few tens of nm to several tens of μm going up to few mm.

A process of manufacturing a humidity sensor device according to an embodiment of the invention will now be described with reference to FIGS. 2a to 2g. For example, by the illustrated process flow, the humidity sensor device 10 shown in FIG. 1 can be produced.

Figure 2A:
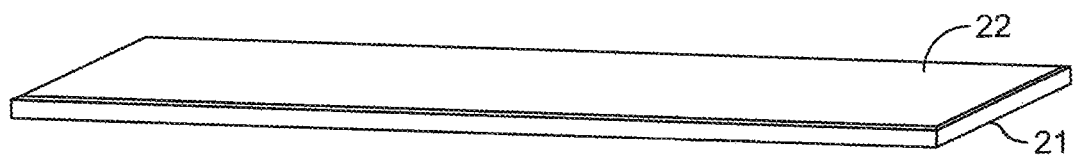
FIG. 2a is a perspective view of a first step of a process of manufacturing the humidity sensor device.
Figure 2B:
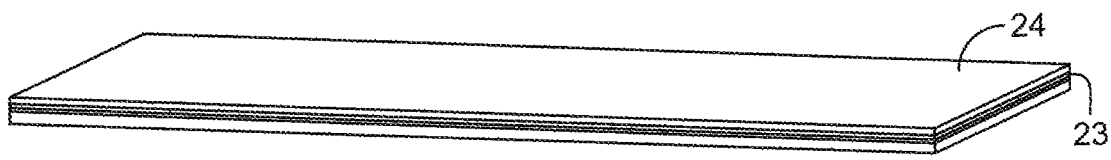
FIG. 2b is a perspective view of a next step of the process of manufacturing the humidity sensor device.
Figure 2C:
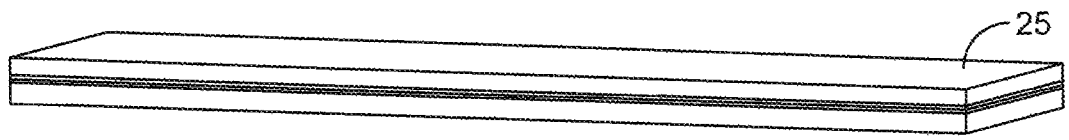
FIG. 2c is a perspective view of a next step of the process of manufacturing the humidity sensor device.
Figure 2D:
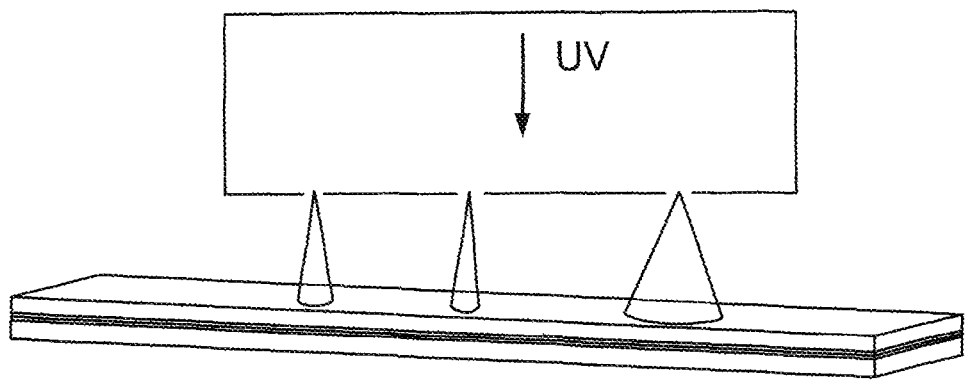
FIG. 2d is a perspective view of a next step of the process of manufacturing the humidity sensor device.

As shown in FIG. 2a, a semiconductor bulk substrate 21, for example, an Si substrate, is provided and an inorganic dielectric layer 22, for example, an $Si_3N_4$, layer is formed, for example, grown, on the semiconductor bulk substrate 21. After the formation/growth of the inorganic dielectric layer 22 an adhesion layer 23, for example, a Cr layer, is formed on the inorganic dielectric layer 22 and an electrode layer 24, for example, an Au layer, is formed on the adhesion layer 23 (see FIG. 2b). The electrode layer 24 may be formed by vapor deposition.

After formation of the electrode layer 24, a photoresist 25 is formed on the electrode layer 24 (see FIG. 2c) for a subsequent photolithography processing. The photoresist 25 may be formed on the electrode layer 24 by spin coating. Further, the photoresist 25 may be a positive or negative photoresist made of a polymer or epoxy resin, for example.

Figure 2E:
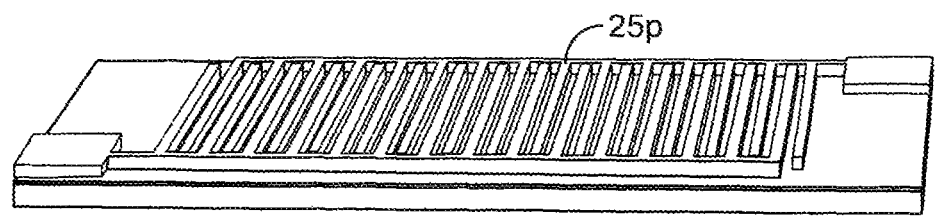
FIG. 2e is a perspective view of a next step of the process of manufacturing the humidity sensor device.

The photoresist 25 is patterned by photolithography (see FIG. 2d) using an appropriate photolithography mask and an exposure light source, for example, a UV light source or an electron beam lithography equipment if one tends to decrease the process limit below few hundreds of nm. FIG. 2e shows the developed patterned photoresist layer 25p. Based on the patterned photoresist layer 25p, structuring of the electrode layer 24 can be performed.

Figure 2F:
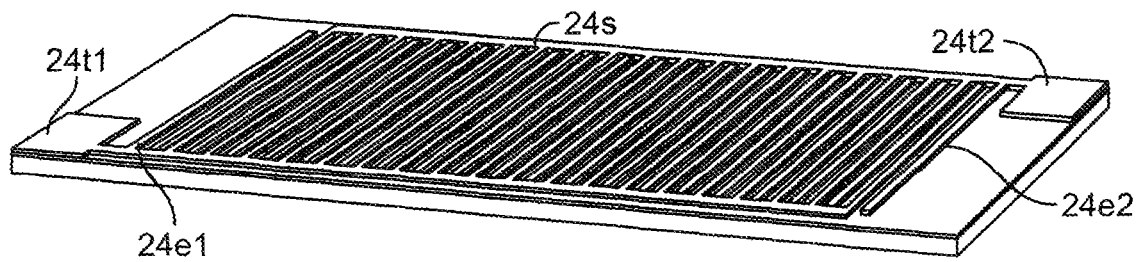
FIG. 2f is a perspective view of a next step of the process of manufacturing the humidity sensor device.

The structuring of the electrode layer 24 can be realized, for example, by reactive ion etching or wet etching and results in the structured electrode layer 24s shown in FIG. 2f. The structured electrode layer 24s comprises a pair of interdigitated electrodes 24e1 and 24e2 and respective electrode terminals 24t1 and 24t2. Thus, in the shown example, the interdigitated electrodes 24e1 and 24e2 and the electrode terminals 24t1 and 24t2 are formed from the same electrode layer 24 and, therefore, in the same horizontal plane above the inorganic dielectric layer 22.

Figure 2G:
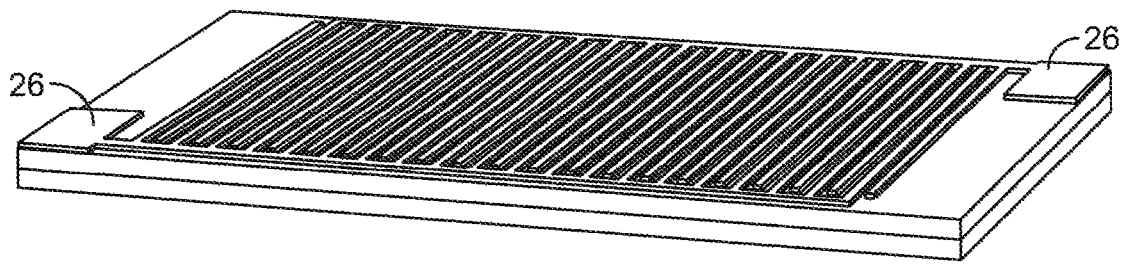
FIG. 2g is a perspective view of a next step of the process of manufacturing the humidity sensor device.

In a next processing step, the patterned photoresist is stripped and the configuration can be cut in order to produce a die and the electrode terminals 24t1 and 24t2 can be used for wire bonding to a printed circuit board by suitable wires 26 that are, for example, made of gold as it is shown in FIG. 2g. The printed circuit board comprises a measuring and control circuitry for processing the sensed data and controlling the humidity sensor device. The printed circuit board may comprise any on-chip circuits that carry out automatic calibration and signal processing to produce a relative humidity measurement. Particularly, the printed circuit board may comprise a temperature sensor for sensing the environmental temperature.

In the above-described manufacturing process flow, no organic materials are involved that are damageable by relative high temperatures involved in the overall mass product manufacturing process. In-situ operation of the obtained humidity sensor device in relatively hot environments can, thus, be envisaged. As it is illustrated in FIGS. 2a to 2g, a humidity sensor device 10 can be easily produced with a high yield by standard mass production semiconductor manufacturing techniques. Using microfabrication, the assembly of the various parts is simplified and alignment can be achieved within the tight limits of microfabrication in contrast to a mechanical assembly like in the prior art. It can be manufactured at compact sizes and does not heavily suffer from severe deteriorations due to aging during its lifetime. The device 10 can be manufactured and operate at relatively high temperatures up to about 300° C., for example, or up to 1000° C. or even higher. Moreover, based on such a configuration a response time of less than a second can be achieved. The humidity sensor device 10 can be used as a stand-alone device for remote sensing in harsh environments characterized by high temperatures and high pressures (for example, a few ten atm or more).

In the above-described embodiments, the sensor device 10 is formed on a semiconductor bulk substrate 21. However, alternatively it may be formed on an insulating substrate, for example, a ceramic substrate, in which case no additional dielectric layer as dielectric layer 22 shown in FIG. 2a may be necessary, or over a semiconductor (sensing/acquisition) microcircuit (wafer), for example, an application-specific integrated circuit (ASIC) or application-specific standard product (ASSP), with an interposed dielectric (insulating) layer that may be made of silicon oxide, nitride or carbide. In these alternative embodiments, reference signs 1 and 21 in the Figures represent the insulating substrate (with no dielectric layer 22 being present) or semiconductor microcircuit, respectively. The sensor element can be connected through vias formed in the dielectric (insulating) layer to the input stages of the circuit.

By an appropriate circuitry, the amount of water absorbed/adsorbed by the inorganic dielectric layer 2 or insulating substrate can be determined and, based on the determined amount of water, the humidity or relative humidity of an environment can be determined given that the temperature of the environment is known. The temperature of the environment can be determined by a temperature sensor that may be comprised in the humidity sensor device 10.

In particular, an environmental (relative) humidity can be sensed by measuring the resistance or impedance of the inorganic dielectric layer 2 or insulating substrate in a region between the interdigitated electrodes 3a, 3b. Alternatively or additionally, the capacitance of the capacitor formed by the pair of interdigitated electrodes 3a, 3b and the material of the inorganic dielectric layer 2 or insulating substrate between the interdigitated electrodes 3a, 3b or the current flowing in the inorganic dielectric layer 2 between the interdigitated electrodes 3a, 3b when voltages are applied to the electrodes can be measured. The measurement can be made by an appropriate sensing circuitry comprised in the humidity sensor device 10.

All previously discussed embodiments are not intended as limitations but serve as examples illustrating features and advantages of the invention. It is to be understood that some or all of the above described features can also be combined in different ways.

What is claimed is:

1. A humidity sensor device, comprising:
   a substrate;
   an inorganic dielectric layer formed on the substrate, the inorganic dielectric layer serves as an adsorbing or absorbing sensing layer; and
   a pair of interdigitated electrodes formed over the substrate and the inorganic dielectric layer.

2. The humidity sensor device of claim 1, wherein the substrate is one of a semiconductor bulk substrate, an insulating substrate, and a semiconductor microcircuit.

3. The humidity sensor device of claim 2, wherein the semiconductor bulk substrate is made of or includes silicon.

4. The humidity sensor device of claim 1, wherein the inorganic dielectric layer is made of or includes a nitride material.

5. The humidity sensor device of claim 1, wherein the interdigitated electrodes are made of or include a noble metal.

6. The humidity sensor device of claim 1, wherein the interdigitated electrodes are arranged in a same horizontal plane parallel to the inorganic dielectric layer.

7. The humidity sensor device of claim 1, further comprising a sensing circuit configured to measure at least one of a resistance of the inorganic dielectric layer, an impedance of the inorganic dielectric layer, a capacity of a capacitor formed by the pair of interdigitated electrodes and the inorganic dielectric layer, and a current flowing through the inorganic dielectric layer.

8. A method of manufacturing a humidity sensor device, comprising:
   providing a substrate;
   forming an inorganic dielectric layer on the substrate, the inorganic dielectric layer serves as an absorbing or absorbing sensing layer; and
   forming a pair of interdigitated electrodes over the substrate and the inorganic dielectric layer.

9. The method of claim 8, wherein the substrate is one of a semiconductor bulk substrate, an insulating substrate, and a semiconductor microcircuit.

10. The method of claim 8, further comprising forming an adhesion layer on the inorganic dielectric layer, the pair of interdigitated electrodes are formed on the adhesion layer.

11. The method of claim 8, wherein forming the pair of interdigitated electrodes includes:
    forming an electrode layer over the inorganic dielectric layer; and
    forming a photoresist layer over the electrode layer.

12. The method of claim 11, wherein forming the pair of interdigitated electrodes includes:
    providing a photolithography mask;
    providing an exposure light source;
    patterning the photoresist layer with the photolithography mask and the exposure light source to obtain a patterned photoresist; and
    patterning the electrode layer with the patterned photoresist.

13. The method of claim 12, wherein the patterning of the electrode layer includes reactive ion etching or wet etching of the electrode layer.

14. The method of claim 12, wherein the patterning of the electrode layer includes forming an electrode terminal for each of the electrodes of the pair of interdigitated electrodes.

15. The method of claim 14, wherein the electrode terminal of each of the electrodes of the pair of interdigitated electrodes is wire bonded to a printed circuit board.

16. The method of claim 9, wherein the semiconductor bulk substrate is made of or includes silicon.

17. The method of claim 8, wherein the inorganic dielectric layer is made of or includes a nitride material.

18. The method of claim 8, wherein the interdigitated electrodes are made of or include a noble metal.

* * * * *